United States Patent [19]

Bjorklund et al.

[11] 3,867,652

[45] Feb. 18, 1975

[54] CONTACTLESS SWITCH

[75] Inventors: Fritz Lars Gunnar Bjorklund, Tyreso; Olaf Sternbeck, Bromma, both of Sweden

[73] Assignee: Telefonaktiebolaget LM Ericsson, Stockholm, Sweden

[22] Filed: Oct. 16, 1973

[21] Appl. No.: 406,856

[30] Foreign Application Priority Data

Nov. 3, 1972 Sweden .......................... 14271/72

[52] U.S. Cl. .................................. 307/309, 330/6

[51] Int. Cl. ......................... H03f 15/00, H01v 5/00

[58] Field of Search ....... 307/309; 330/6; 332/51 H; 324/117 H, 45; 338/32 H

[56] References Cited

UNITED STATES PATENTS

| | | | |
|---|---|---|---|
| 3,422,351 | 1/1969 | Pihl | 324/45 X |
| 3,573,616 | 4/1971 | Kahen | 324/117 H |
| 3,613,021 | 10/1971 | Scheidt | 330/6 |

OTHER PUBLICATIONS

IBM Technical Disclosure Bulletin, Hall Effect Feed-back Circuit, by T. W. Collins, Vol. 13, No. 8, 1/71, p. 2448.

*Primary Examiner*—Stanley D. Miller, Jr.
*Assistant Examiner*—B. P. Davis
*Attorney, Agent, or Firm*—Hane, Baxley & Spiecens

[57] ABSTRACT

The invention refers to a contactless switch, comprising a Hall-effect element that has a pair of input electrodes for applying an operating voltage to generate a current in an internal current path and at least one output electrode located adjacent the current path to derive a Hall-potential when an external magnetic field influences the current laterally, and an amplifier circuit that is controlled by the Hall-potential. According to the invention, the Hall-effect element is provided with at least one control electrode for controlling the magnitude of such current, and the amplifier circuit is provided with at least one output terminal connected to the control electrode of the Hall-effect element for feeding back an amplified Hall-potential in such a phase that the amplifier circuit is provided with positive feed-back.

3 Claims, 2 Drawing Figures

CONTACTLESS SWITCH

The invention relates to a contactless switch comprising a Hall-effect element that has a pair of input electrodes for applying a supply voltage to generate a current in an internal current path and at least one output electrode located adjacent the current path to derive a Hall-potential when an external magnetic field influences the current laterally, and an amplifier circuit that is controlled by the Hall-potential.

A contactless switch, comprising a Hall-effect element and an amplifier circuit that is controlled by the Hall-potential from the Hall-element, is previously known through the U.S. Pat. specification No. 3,596,114 the amplifier circuit having the form of a Schmitt-trigger and the Hall-effect element having two output electrodes, which electrodes are so offset in their mutual position between two input electrodes of the Hall-element that they derive a prebias on the Schmitt-trigger from a supply voltage applied to the input electrodes to ensure the transition of the switch when it is operated by external magnetic fields of varying intensity. A disadvantage with this switch is, however, that it is difficult to obtain well-defined transition points owing to unavoidable tolerances in the geometrical displacement of the output electrodes as well as to the well-known temperature sensitivity of the Hall-potential.

According to the invention a contactless switch is obtained which comprises a Hall-effect element and has well-defined transition points. The invention is characterized as it appears from the appended claims.

Figure 1:
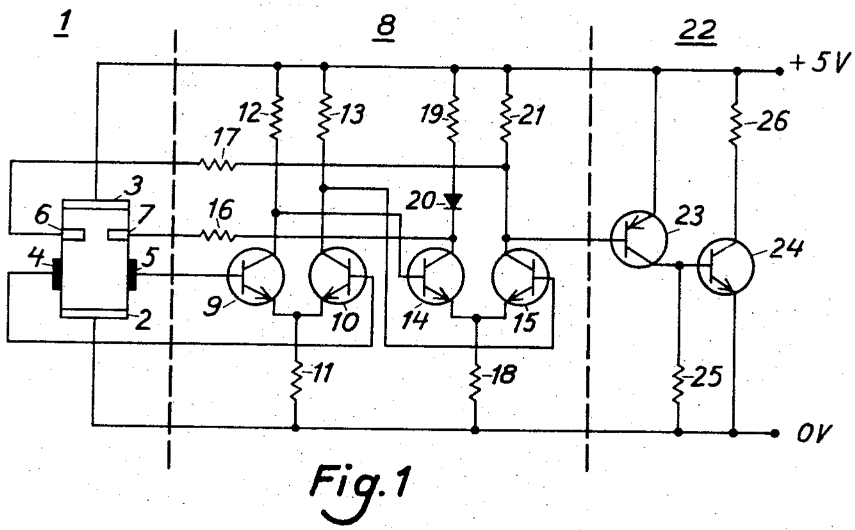
Figure 2:
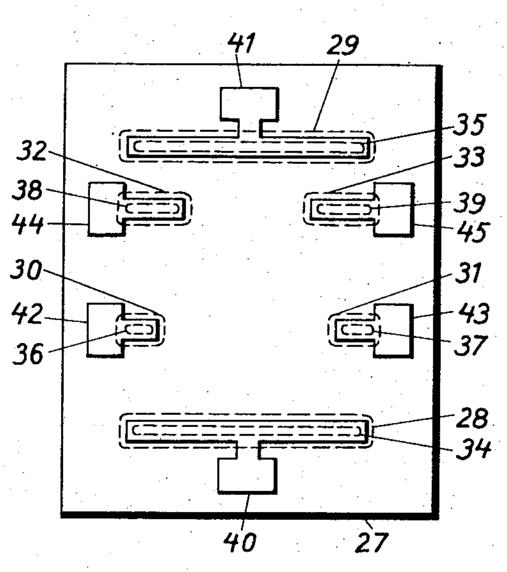

The invention will now be described more in detail with reference to the accompanying drawing, where FIG. 1 shows a circuit diagram of a contactless switch in a preferred embodiment according to the invention and FIG. 2 shows an upper view of a Hall-effect element that is included in the switch in FIG. 1 and is produced in a semiconductor body.

FIG. 1 shows a contactless switch according to the invention, comprising a Hall-effect element 1 that has a pair of input electrodes 2 and 3 for applying a supply voltage of 5V to generate a current in an internal current path, a pair of output electrodes 4 and 5 to derive two Hall-potentials when an external magnetic field influences the current in the internal current path laterally, and a pair of control electrodes 6 and 7 for controlling the magnitude of the current. The output electrodes 4 and 5 and the control electrodes 6 and 7 are symmetrically located between the input electrodes 2 and 3 on both sides of the current path. The switch comprises furthermore an amplifier 8 in which two NPN-transistors 9 and 10 are connected via a common emitter-resistor 11 and a separate collector-resistor 12 and 13, respectively, to the supply voltage of 5V and form a differential input stage with a pair of input terminals consisting of the base electrodes of the transistors 9 and 10 which are connected to the output electrodes 4 and 5 of the Hall-effect element 1.

The amplifier circuit 8 comprises a second differential stage which is connected in cascade with the differential input stage and consists of two NPN-transistors 14 and 15, whose base electrodes are connected with the collector electrodes of the transistors 9 and 10 and the collector electrodes of which are connected to the control electrodes 6 and 7 of the Hall-effect element 1 via a separate resistor 16 and 17, respectively, for feeding back two amplified Hall-potentials in such mutually opposed phases that the amplifier circuit 8 is provided with positive feedback and obtains two stable conditions between which conditions transistors can occur upon the influencing the current in the internal current path of the Hall-element 1 laterally by an external magnetic field. The transistors 14 and 15 are, via a common emitter-resistor 18, and a collector-resistor 19 in series with a diode 20 and a collector-resistor 21, respectively, connected to the supply voltage of 5V.

The purpose of the diode 20 in the amplifier circuit 8 is to constitute a temperature dependent load for the amplified Hall-potential which is fed back to the control electrode 7 of the Hall-effect element 1 in order to counteract the temperature dependent variation of the Hall-potential. The diode 20 is biased in the forward direction and its forward voltage-drop has a temperature coefficient of the same sign as the Hall-potential from the Hall-effect element 1. Furthermore, the resistance of the resistors 16 and 19 and the magnitude of the temperature coefficient of the diode 20 are so chosen that the Hall-potential will be maintained substantially constant within the operative temperature interval for the switch.

The switch according to the invention contains finally an output stage 22 consisting of two common-emitter coupled stages with two transistors 23 and 24 of PNP type and NPN type, respectively, in direct-coupled cascade connection. The base electrode of the transistor 23 is connected to the collector electrode of the transistor 15 and its collector-emitter current path is connected to the supply voltage of 5V via a collector-resistor 25. Furthermore, the base electrode of the transistor 24 is connected to the collector electrode of the transistor 23 and its collector-emitter current path is connected to the supply voltage of 5V via a load 26 to the switch.

FIG. 2 shows a top view of the Hall-effect element 1 in FIG. 1 produced in a semiconductor body consisting of a P type silicon substrate which is supplied with a thin N type epitaxial layer, in which said electrodes 2–7 of the Hall-effect element are arranged in the form of indiffused N+ type regions 28–33 which are covered with an oxide layer and are, through windows 34–39 in the oxide layer, provided with electrode contacts 40–45 produced by means of metallization and etching in well-known manner. The input electrodes 2 and 3 correspond here to the regions 28 and 29, the output electrodes 4 and 5 to the regions 30 and 31, and the control electrodes 6 and 7 to the regions 32 and 33. It is to be noted that in spite of the geometrical symmetry of the Hall-element 1 according to FIG. 2, the current flow generated between the input electrodes 2 and 3 is in operative condition very asymmetrically distributed with regard to the output electrodes 4 and 5 due to the fact that one of the control electrodes 6 and 7 but not both of them carries current in the respective stable conditions of the amplifier circuit 8. Thanks to the fact that the on- and off-conditions of the switch consequently are determined by an electrically controlled asymmetry in the current flow of the Hall-effect element 1 with regard to the output electrodes 4 and 5, it is only a question of circuit design to obtain well-defined and temperature stabilized transition points for the switch if for example the Hall-effect element 1, the amplifier circuit 8 and the output stage 22 are integrated with conventional production tolerances in one and the same semiconductor body in well-known manner.

We claim:

1. Contactless switch comprising a Hall-effect element that has a pair of input electrodes for applying a supply voltage to generate a current in an internal current path and at least one output electrode located adjacent the current path to derive a Hall-potential when an external magnetic field influences the current laterally, and an amplifier circuit that is controlled by the Hall-potential, the Hall-effect element being provided with at least one control electrode controlling the magnitude of said current and the amplifier circuit being provided with at least one output terminal connected to said control electrode of the Hall-effect element for feeding back an amplified Hall-potential in such a phase that the amplifier circuit is provided with positive feedback, the amplifier circuit further comprising a two-terminal device that has a voltage drop with a temperature coefficient of the same sign and at least the same magnitude as the Hall-potential of the Hall-effect element and that is connected to said output terminal of the amplifier circuit in such a way that it constitutes a load for the amplified Hall-potential.

2. Contactless switch according to claim 1, wherein the Hall-element and the amplifier circuit are produced in one and the same semiconductor body.

3. Contactless switch according to claim 1, wherein the Hall-effect element comprises a pair of control electrodes and a pair of output electrodes in the main symmetrically located between said pair of input electrodes and straddling said current path, and the amplifier circuit comprises a pair of differential input terminals connected to said pair of output electrodes and a pair of output terminals connected to said pair of control electrodes for feeding back two amplified Hall-potentials in such mutually opposed phases that the amplifier circuit is provided with positive feedback, said two terminal device being connected to one of said pair of output terminals of said amplifier circuit.

* * * * *